UNITED STATES PATENT OFFICE.

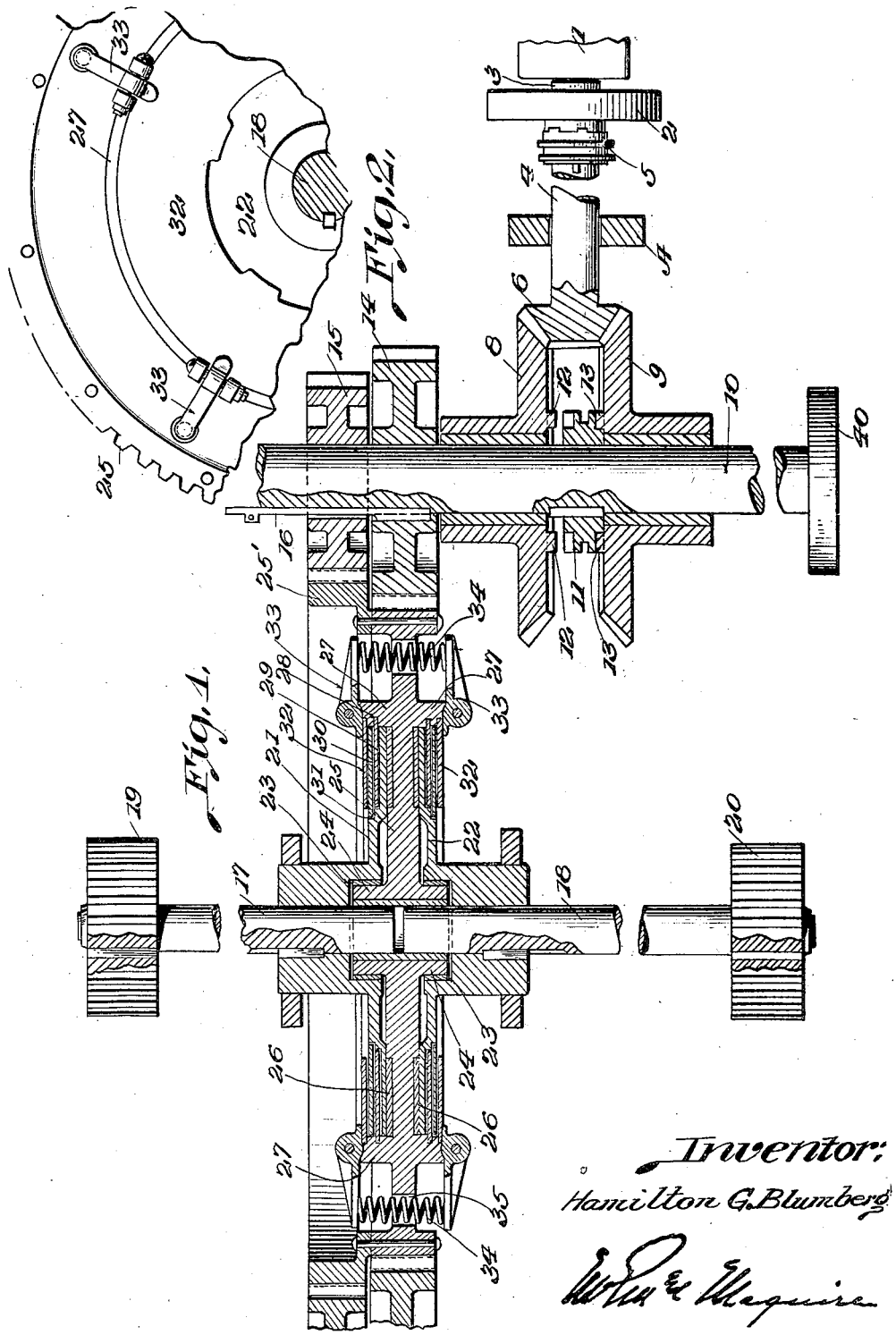

HAMILTON G. BLUMBERG, OF ORANGE, TEXAS.

TRANSMISSION-GEARING.

1,368,882.  Specification of Letters Patent.  Patented Feb. 15, 1921.

Application filed March 7, 1919. Serial No. 281,190.

*To all whom it may concern:*

Be it known that I, HAMILTON G. BLUMBERG, of Orange, in the county of Orange and State of Texas, have invented certain new and useful Improvements in Transmission-Gearings; and I do hereby declare the following to be a full, clear, and exact description of the invention, such as will enable others skilled in the art to which it appertains to make and use the same.

My invention relates to transmission gearing, and the object is to provide an improved gear set especially adapted for transmitting power to the main driving wheels of farm tractors, the gear set embodying simple and efficient means for effecting a reversal of travel without any chance of gear stripping, and including an improved differential gearing, the whole transmission gearing being encompassed in a minimum of space.

In the accompanying drawings, Figure 1 is a view in horizontal section. Fig. 2 is a fragmentary detail.

Referring to the drawings, 1 designates an engine, which is conventionally shown, as is the fly wheel 2 on the shaft 3 of the engine. The driving shaft 4 is appropriately connected with the engine shaft through a clutch 5, and the shaft 4 carries a driving gear 6 with which beveled gears 8 and 9 are always in mesh. The shaft 4 is appropriately supported in a bracket A of the tractor frame. The gears 8 and 9 are rotatably mounted upon a shaft 10 and adapted to be locked to the shaft by a double clutch 11 splined to and slidable on the shaft, the gears having pins 12 and 13 on their opposed faces for taking in cut outs in the clutch 11. On the shaft 10 are gears 14, 15, through which power is transmitted to the mechanism for driving the tractor wheels, a sliding key 16, operable in any preferred manner being the means by which one or the other of said gears is locked to the shaft 10. The described gearing is a preferred means for transmitting power to the differential gearing hereinafter described.

17, 18 designate two alined shafts having pinions 19, 20, respectively, at their outer ends, such pinions being appropriately connected for driving the wheels of the tractor. Adjacent the inner contiguous ends of the shafts 17 and 18 are a pair of driving disks 21, 22, which are fast on their respective shafts. The opposed faces of these disks are recessed at 23 to receive a flange 24 of a gear 25 which is interposed between the driving disks, such gear being rotatably supported on the ends of the shafts 17, 18. The disks 21, 22 are frictionally driven by the gear 25 either through the gear 14 or the gear 15, the latter meshing with a ring gear 25' bolted to the gear 25. This arrangement provides for a lower gearing than that provided by gears 25—14. Within the recesses on each side of the gear 25 are fitted ring plates 26 which are designed to frictionally engage the driving disks on their inner faces. The gear 25 is also provided with annular members 27 projecting laterally therefrom, and each of these members is grooved, as at 28, to receive the periphery of a second ring plate 29, one face of which plate bears against the outer face of the driving disk and the other against a third ring plate 30 the inner edge of which latter fits in a recess 31 of the disk. 32 designates a fourth ring plate. The plates 29, 30 and 32 lie one next the other and the outermost plate 32 is adapted to be engaged by the short end of each of a series of levers 33 working in cut outs in the annular member 27 and having pivotal connection with such member. A series of coiled springs 34 extend through openings 35 in the gear 25 and are adapted to bear against the long arms of the complementary levers. The tension of these springs is such that the short arms always bear firmly on the outermost ring plate 32 to insure frictional contact between all contacting faces of the friction members.

By the arrangement of the several friction ring plates and the control of those affecting both the driving disks 21, 22 by springs common to both the same degree of friction is obtained between the gear 25 and each of the driving disks. These springs also allow of the slipping between either of the driving disks and the gear 25 as may be necessary in turning, and this is effected without the interposition of any manually operated means.

In addition to securing an effective transmission gear and one which obviates any chance of stripping the gears in reversing the drive, I also am enabled to use my improved gear set for the purpose of transmitting power for stationary work, pulleys, such as 40, on the ends of the shaft 10 being adapted for this purpose.

It will be observed that by the construction herein described the gear set is readily and easily reversed from forward or rearward drive, all gears being always in mesh and that there are no stresses or strains in the clutch members of the driving mechanism.

I claim as my invention:

1. Differential gearing including a pair of driven shafts, a disk fast to each shaft, a driving gear interposed between said disks, friction plates carried by said gear and said disks, means carried by said gear for insuring contact between said driving gear and said disks, and a prime mover for said driving gear.

2. Differential gearing including a pair of driven shafts, a disk fast to each shaft, a driving gear interposed between said disks, friction plates carried by said gear and said disks, spring actuated means carried by said gear for insuring contact between said driving gear and said disks, and a prime mover for said driving gear.

3. Differential gearing including a pair of driven shafts, a disk fast to each shaft, a driving gear interposed between said disks, friction plates carried by said gear and said disks, pairs of levers carried by said gear and arranged on opposite sides thereof for compressing said friction plates, springs acting on said levers, and a prime mover for said driving gear.

4. Differential gearing including a pair of driven shafts, a disk fast to each shaft, a driving gear interposed between said disks, friction plates carried by said gear and said disks, pairs of levers carried by said gear and arranged on opposite sides thereof for compressing said friction plates, springs acting on said levers, each spring being common to a pair of levers, and a prime mover for said driving gear.

In testimony whereof I have signed this specification.

HAMILTON G. BLUMBERG.